3,071,534
PROCESS AND APPARATUS FOR SEPARATING
PARAFFINS FROM HYDROCARBON OILS
Alfred Hoppe and Hermann Franz, Frankfurt am Main,
Germany, assignors to Edeleanu Gesellschaft m.b.H.,
Frankfurt am Main, Germany, a corporation of Germany
Filed Sept. 2, 1958, Ser. No. 758,255
Claims priority, application Germany Sept. 18, 1954
10 Claims. (Cl. 208—25)

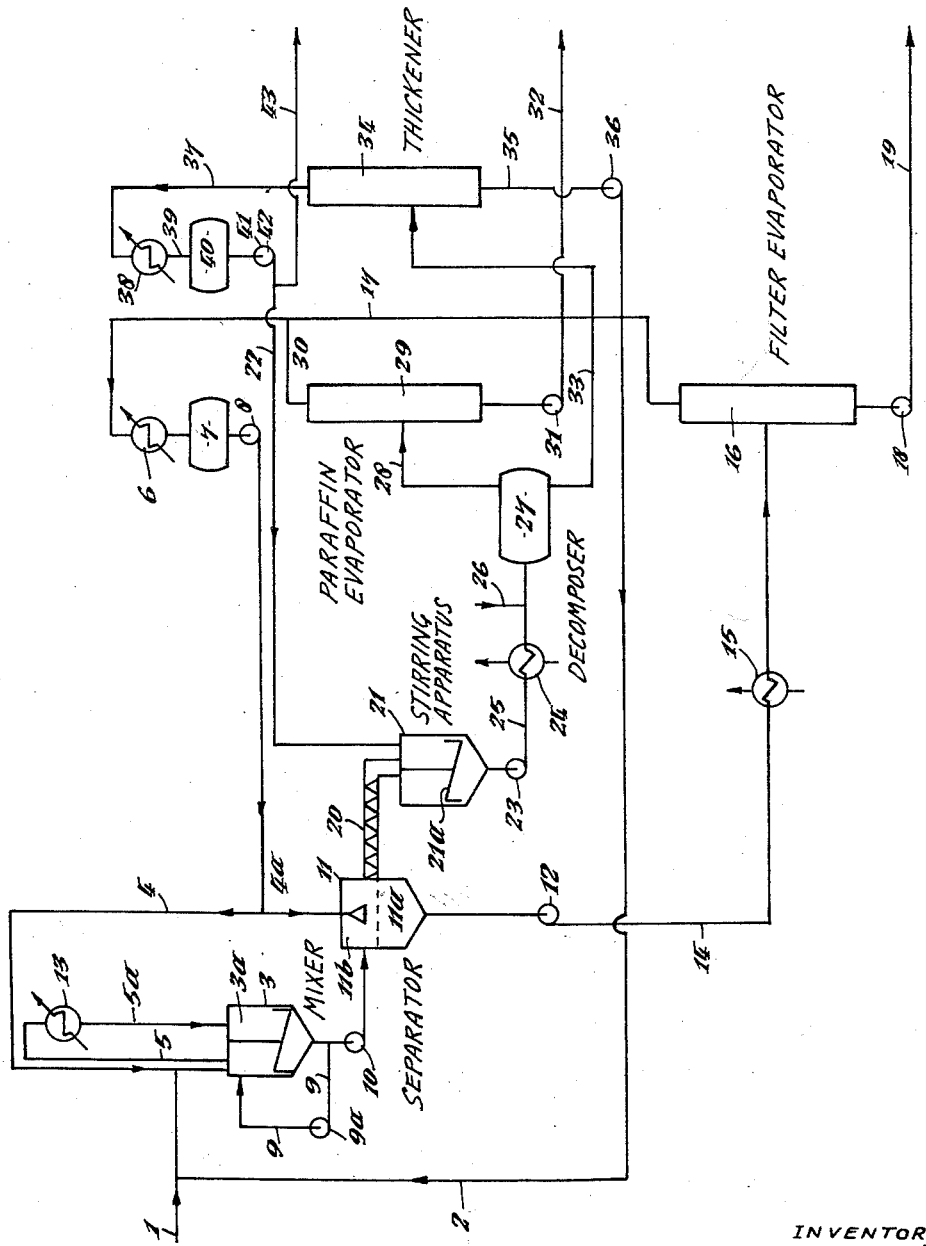

This application is a continuation-in-part of application Serial No. 533,699 of Alfred Hoppe et al., filed September 12, 1955, now abandoned.

It is known that the action of urea or solutions of urea on straight-chain paraffinic hydrocarbons leads to the formation of crystalline complexes, so-called adducts. Derivatives of normal paraffins, such as those containing oxygen, nitrogen, sulphur or halogen, and also olefines, likewise yield such complexes, provided that they contain no or only short side chains.

The formation of adducts of substantially straight-chain hydrocarbons with urea is used in the mineral oil industry for separating paraffins, and more especially paraffin wax, in a simple manner. For this purpose the hydrocarbon oil is mixed with urea or a solution of urea, and maintained in contact with the urea or solution thereof until the formation of adduct is finished. The resulting solid adduct is separated from the oil solution and is decomposed by heating it at a relatively high temperature and/or by the addition of solvent into paraffins and urea or a solution of urea. After removal of the solvent, the paraffins constitute one of the final products and the hydrocarbons not forming adducts constitute the other final product, for example, an oil of low pour point. The urea solution which is recovered is re-used for adduct formation.

The optimum temperature for adduct formation is dependent on the sizes of the molecules of the hydrocarbons, and is generally within the range of $-10°$ C. to $+50°$ C. The proportion of urea required increases as the length of the chains increases, and amounts on an average to 3 parts by weight of urea to 1 part by weight of paraffin. The initiation and termination, and also the completeness, of adduct formation are influenced by the use of solvents for the urea. As solvents there may be used water, lower alcohols, such as methanol or ethanol, and also ketones and the like. The proportion of the solvent varies within wide limits. The urea is used in the form of a saturated or supersaturated solution or in the form of a magma wetted with solvent. Viscous oils and those rich in paraffin wax are diluted with solvents, for example, with gasoline, benzene, organic halogen-compounds or the like, before the treatment.

While urea leads to adduct formation with straight-chain paraffins and derivatives thereof, a corresponding adduct formation takes place between thiourea and branched-chain paraffins and naphthenes under conditions which largely resemble those described above for urea adducts. Accordingly, the process hereinafter described can be applied in a similar manner for separating isoparaffins and naphthenes from hydrocarbon mixtures by means of thiourea. However, in the interests of simplicity the invention is illustrated only in connection with a process for separating normal paraffins from hydrocarbon oils by means of urea.

The industrial application of the above process, however, involves numerous difficulties. It is essential in a process in which the oil is stirred with urea or a urea solution to precipitate an adduct, that the precipitate should separate out easily and be easily freed from liquid adhering thereto. In most cases, however, the adduct forms a mass which is difficult to separate from the oil solution. It is possible only by centrifuging and lengthy washing to obtain the adduct and the solution as two satisfactorily separated products. An object of the invention is to enable the process of adduct formation to be carried out in such manner that separation of the solid and liquid phases can be performed without difficulty and completely with simple means.

A further object of the invention is to shorten the process of adduct formation, that is to say, to initiate the desired reaction immediately after the reaction components have been mixed together and to terminate it in a short time.

The invention is based on the observation that an adduct of granular character can be formed in a short time, if the reaction components are caused to react with one another under certain conditions. In accordance with the invention a mixture consisting of 90 to 60% by weight of urea or thiourea and 10 to 40% by weight of water is mixed with the oil to be treated and with an oil solvent the boiling point of which is not higher than the temperature desired for the adduct formation; the mixture consisting of oil, oil solvent, urea and water is vigorously agitated, then brought to and maintained at the temperature desired for the adduct formation. The granular adduct so formed is separated from the oil solution, and the adduct is decomposed into paraffinic material and a solution of the amide, i.e. urea or thiourea.

The mixture of water and urea for the treatment of the paraffinic material can be a suspension of urea in a urea solution or a clear solution. The mixture is a suspension if the temperature of the mixture consisting of urea and 10 to 40% by weight of water lies below the lower temperature of saturation, i.e. below 60° C.; above this temperature the solution will be clear according to the temperature and the composition (a mixture of 60% by weight of urea and 40% by weight of water is a clear solution at 60° C., that of 90% by weight of urea and 10% by weight of water at 90° C.).

An adduct formation between the urea in solution and the paraffines will take place, and that irrespective of the temperature the mixture of urea and water has in the moment it is contacted with the paraffinic material. It is, however, advantageous to use hot clear solutions for the adduct formation. Such solutions are recovered by regenerating the urea solution from the adduct. The clear solutions can be transported without any difficulty to the place of adduct formation. Without any intermediate treatment they are mixed with the cooler oil and oil solvent. Since the oil solvent has its boiling point below the lower temperature of saturation (60° C.) the urea solution is cooled below this temperature of saturation. Due to cooling by the oil and evaporation of a part of the oil solvent, a part of the amide separates out of the amide solution in a finely divided very active form and takes part in the adduct formation in situ. By the evaporation of a part of the oil solvent the optimum temperature for adduct formation is established. The mixture is also diluted by the oil solvent, so that, when a viscous oil rich in paraffin wax is used, a mixture is obtained which can be pumped and easily freed from solid adduct. The formation of a granular adduct sets in after stirring for a short time. When the formation of the adduct is complete, the mixture is separated from the oil solution by settling or by means of a sieve or filter. The solvent is removed from the hydrocarbon solution, which is free from adduct, and an oil having the desired pour point is obtained. The adduct is decomposed to yield, on the one hand, normal paraffins, for example, paraffin wax, and, on the other, urea solution which can be re-used. The process of the present invention is especially suitable for separating from oils of high pour point the paraffin wax contained therein.

The following is a more detailed description of the process.

The speed and completeness of the adduct formation and the form of the adduct depend to a great extent on the proportion of water present during the adduct formation. As the proportion of water is increased up to about 40%, the period required for stirring becomes shorter, both up to the beginning and up to the completion of the adduct formation. If less than 10% of water is added to the mixture of oil and urea, there is obtained an extremely finely crystalline adduct, which is suspended in the hydrocarbon solution and cannot be filtered off. Centrifuging operations would be necessary to separate it, and washing would have to be coupled with centrifuging. When, on the other hand, 10-40% of water is present a granular adduct precipitates which settles out rapidly, and can be easily separated by means of a sieve or by filtration and can also be washed easily. Thus, costly centrifuging operations are avoided. The reason for this improvement is that with water contents up to 40% the whole of the water present during adduct formation migrates into the adduct, and imparts thereto the especially valuable coarsely granular structure. When the adduct formation is complete, there is then present, in addition to the solid adduct a phase consisting of the paraffin-free hydrocarbon oil and the solvent.

If the water content of the urea solution were increased above 40% a thick stiff magma would be formed during the adduct formation. The adduct would be coarsely flocculent, lumpy and suspended in an oil-water emulsion. The magma could not be stirred, and it could be separated and washed only with extreme difficulty, if at all, and then only by centrifuging. The centrifuged liquid contains, in addition to the oil phase, an aqueous layer consisting of diluted urea solution which must be separated from the oil phase. The greater the quantity of water, the greater is the amount of urea that remains in the solution unused, that is to say, not bound to paraffin, and which must be circulated through the plant as ballast.

The ratio between urea and water in the mixture the oil shall be treated with, is therefore of great importance for the process according to the invention. A mixture of 10 to 40% by weight of water and 90 to 60% by weight of urea offers advantages not obtained with mixtures of other compositions. As already mentioned, the mixture of urea and water can have any possible temperature if mixed with the oil. The temperature can lie below the temperature of adduct formation; in this case the mixture represents a urea solution with urea suspended therein and has to be warmed to the temperature of adduct formation. The mixture will be a suspension as long as it is cooler than the lower temperature of saturation of the said urea-water mixture, i.e. up to a temperature of 60° C. At this temperature a mixture of 60% by weight of urea and 40% by weight of water forms a clear solution. With rising temperatures more and more urea is solved in the water: thus, a clear solution saturated at 90° C. consists of 90% by weight of urea and 10% by weight of water. According to the invention suspension or solutions respectively, of 90 to 60% by weight of urea and 10 to 40% by weight of water are used. Hot solutions offer the advantage that they can be used as they are recovered in the continually operated plant—and that without any intermediate treatment—and that they precipitate the urea by cooling when the urea solution is mixed with the cooler oil and the lower boiling oil solvent in active form due to the fact that it is formed in situ. These hot solutions can be clear solutions or suspensions of urea in urea solution.

As oil solvents there are used those which boil within the temperature range in which the adduct formation is carried out. This temperature range depends on the prevailing conditions. Spindle oils and gas oils, for example, are treated at +35° C. to +45° C., and fractions of lower molecular weight at correspondingly lower temperatures. As such solvents there may be used, for example, hydrocarbons having suitable boiling points, such as butane, pentane, pentadiene and the like, but there are preferably used fluorinated or chlorinated hydrocarbons. Among the latter methylene chloride is especially suitable owing to its boiling point of +41° C. and its selective properties.

Methylene chloride has a very good solvent power for the oil, and does not dissolve appreciable quantities of adduct. The pour point of the final oil is considerably lower, that is to say, the quantity of paraffins separated is greater, when methylene chloride is used for dilution than it is when other solvents are used.

It is necessary to keep the proportion of methylene chloride used as diluent within certain limits. If the proportion used for dilution is less than 50 percent by volume of the oil used, there is obtained, especially with paraffin-rich and viscous oils, a magma which is difficult to filter, instead of the desired granular adduct. If, on the other hand, the proportion of methylene chloride is increased from 200 percent by volume of the oil upwards a gradual and distinct increase in the pour point of the dewaxed oil occurs. Moreover, the reaction period, that is to say, the period within which adduct formation is completed, is a minimum within the limits of 50-200 percent by volume of methylene chloride. If less than 50 percent by volume or more than 200 percent by volume is used longer reaction periods are required to complete the formation of adduct than when the proportion is within the range of 50 to 200 percent by volume. Methylene chloride, like the oil, dissolves practically no water. Owing to its hydrophobic properties it enhances the tendency of the water to migrate into the adduct.

The fact that the boiling point of the oil solvent is within the temperature range desired for adduct formation is a very great technical advantage. The urea solutions preferably used for adduct formation are strongly supersaturated with urea at the temperatures used for adduct formation. In order to facilitate their conveyance to the mixer, they are first maintained at a temperature at which they form clear solutions. Cooling of the solutions to the temperature of adduct formation must be carried out in direct contact with the paraffins to be separated, in order to enable the urea to be used in an active form for adduct formation. If the cooling were carried out indirectly, for example, by means of cooling pipes, deposits of paraffins and solid urea would form on the surface of the pipes, and these deposits would reduce the cooling action to an extraordinary extent and disturb the course of adduct formation. The cooling can be brought about in a simple manner by the evaporation of solvent, since the boiling point of the latter is within the desired range and establishes the desired temperature automatically. Adduct formation takes place with the evolution of heat, and the heat so generated is also absorbed by evaporation of the solvent. Thus, by arranging above the mixer a condenser for condensing the evaporated oil solvent and returning it to the mixer, a simple and reliable method of regulating the temperature for favourable adduct formation is achieved.

After termination of the adduct formation, there is present a mixture of granular adduct and oil solution. No aqueous phase exists. The whole of the water is contained in the adduct, as described above. The granular adduct separates out as the solid phase, and can easily be isolated by decantation or filtration and washed.

Optimum results in the present process are obtained only when the nature and proportion of the solvent for the urea and for the oil, and the optimum temperature, are used.

Thus, for example, 100 parts by weight of a urea solution containing 30 percent by weight of water are mixed at a temperature of 75° C. with 100 parts by volume of spindle oil (temperature 45° C.) and with 100 parts by volume of methylene chloride. By the consequent evaporation of methylene chloride the temperature of the mixture falls to 41° C. The mixture is stirred for a few seconds, and then adduct formation sets in and is complete in a short time.

In some cases it is desirable first to mix the hot urea solution with the oil to be treated, whereby the urea solution is cooled to such an extent that a part of the urea precipitates out, and subsequently the oil solvent is added to the mixture. By evaporation of a part of the oil solvent the optimum temperature is established automatically.

The granular adduct formed in the process is separated from the mixture. This can be performed, as already mentioned, by settling, sieving or filtration.

The adduct-free oil-solvent mixture contains practically no water and no urea. It is freed from solvent in an evaporator and passed to a storage tank.

The adduct is split up into paraffin and urea solution at a temperature above 70° C. The quantity of water present in the adduct is sufficient for the decomposition of the adduct into its components. However, high temperatures up to 100° C. and long decomposition periods are then necessary. The decomposition of the adduct takes place more easily the lower the concentration of urea in the urea solution. Accordingly, the adduct is advantageously diluted with hot aqueous condensate containing methylene chloride from a later stage of the process, and then very rapidly heated to a temperature above 70° C., preferably 70–80° C., by indirect heating and by the direct introduction of steam. At that temperature two layers form immediately. The upper layer consists of normal paraffins and contains methylene chloride and some water. By evaporating the solvent the pure paraffins are obtained as final products. The lower layer contains in aqueous solution the urea from the adduct and a small amount of methylene chloride. The concentration of this urea solution is relatively low owing to the addition of condensate and the direct introduction of steam. In order to enable the urea solution to be re-used it is evaporated in a so-called "thickener" until the urea solution contains about 10–40 percent by weight of water. The solution is again used in the hot state in order to treat fresh oil. It is, however, also possible—as already set forth above—to use hot or cold suspensions of urea in urea solution if the solutions from the thickener were brought to lower temperatures for operational reasons.

The vapours evaporated from the urea solution are condensed, and a part of the condensate is re-used for decomposing adduct. An especially advantageous feature of the invention consists in fractionally condensing the vapours and using the aqueous condensate, which contains a relatively large amount of methylene chloride, for decomposing the adduct.

By returning the thickened urea solution the cycle, through which the urea solution is passed from the formation of the adduct to its decomposition, is completed. Optimum conditions for the decomposition of the adduct are also ensured by returning to the vessel, in which the adduct is decomposed, the water fraction distilled from the thickener and having a relatively high content of methylene chloride.

Accordingly the invention also includes a process in which the oil is split up into the desired end products in a continuous manner without consuming the auxiliary agents, the supply and removal of which would burden the process to a degree beyond that absolutely necessary.

The invention is described by way of example with reference to the accompanying drawing, which shows an apparatus for carrying out the process in a continuous manner for the separation of paraffin wax, that is to say, normal paraffinic hydrocarbons, from hydrocarbon oils by means of an aqueous solution of urea with the use of methylene chloride as oil solvent.

The oil at a temperature slightly above its melting point is mixed in the conduit 1 on its way to the mixer 3 with hot highly concentrated urea solution from the conduit 2. The warm mixture at about 50° C. is diluted by the addition of methylene chloride from the conduit 4, and then enters the mixer 3. The temperature of the mixture in the mixer becomes that of the evaporation of the methylene chloride, i.e. about 41° C. The methylene chloride continuously circulates through a system consisting of a conduit 5 for the methylene chloride vapor, a condenser 13 and a conduit 5a through which the condensed methylene chloride is returned to the mixer.

The mixture is stirred for a short time in the mixer 3 by means of a stirring device 3a. The mixing is intensified, and the formation of adduct is accelerated and completed, by circulating the mixture through conduits 9 and a mixing device, for example, a turbomixer 9a. The suspension of solid adduct in the solution of the oil in solvent is fed by means of a pump 10 to a separator 11, where it is split up by means of a filter or sieve plate 11a into solid adduct and filtrate. The adduct is washed with methylene chloride supplied to a spray nozzle 11b through a conduit 4a.

The filtrate is passed by means of a pump 12 through conduit 14 and heat exchanger 15 into a filtrate evaporator 16. In the latter the methylene chloride is distilled off, and the vapour passes through a conduit 17 into a condenser 6 where it is condensed and flows into a receiver 7. A pump 8 feeds the methylene chloride to conduit 4, whence it is returned to the mixer 3. A part of it passes through the conduit 4a to the washing nozzle 11b.

The oil freed from methylene chloride in the evaporator 16 is withdrawn from the plant by a pump 18 and conduit 19 as finished oil. During the splitting up of the mixture in the separator 11, there can be removed first a main filtrate and then a separate wash-filtrate from the washing of the solid material. The wash-filtrate may be returned directly to the mixer 3 as diluent (means for this not being shown). In this case only the main filtrate is passed to the evaporator 16.

The adduct is fed by means of a worm conveyor 20 into a stirring apparatus 21 having a stirring device 21a and is there stirred with hot aqueous condensate from a conduit 22. The magma is fed by a pump 23 through conduit 25 and heater 24 to the decomposer 27. On its way to the decomposer 27 the magma is directly heated by steam from a conduit 26.

Two layers are formed in the decomposer 27. The upper layer consisting mainly of paraffins and a small amount of methylene chloride passes through conduit 28 into a so-called paraffin evaporator 29, where the methylene chloride is expelled. The vapors pass through conduits 30 and 17 into condenser 6. The paraffins are fed by a pump 31 through conduit 32 into a tank (not shown).

The lower layer in the decomposer 27, which layer consists of an aqueous solution of urea and a very small amount of methylene chloride, is drawn through a conduit 33 into a thickener 34. In the latter sufficient water is evaporated to yield a solution containing 10–40 percent of water. The latter solution is fed by a pump 36 into the conduit 2, and thence, as described above, into the conduit 1, where it is mixed with the charge.

The vapors from the thickener 34 pass through a conduit 37 into a condenser 38 in which they are liquefied. The condensate passes through conduit 39, collects in the receiver 40, and is returned from a conduit 41 by a pump 42 through conduit 22 to the stirring apparatus 21, where it is mixed with the adduct. A small portion of the condensate is withdrawn by way of a conduit 43 and discarded.

The following example of a dewaxing process illustrates the invention:

100 parts by volume of spindle oil having the following characteristics:

| | |
|---|---|
| Density at 15° C | 0.870 |
| Pour point °C | +14 |
| Cloud point °C | +15 |
| Viscosity (° Engler at 50° C.) | 1.66 |
| Paraffin content | About 14% by weight | were mixed with 100 parts by volume of methylene chloride and 100 parts by volume of a saturated aqueous solution of urea (saturated at 70° C.) having a water content of 30 percent. The initial oil had a temperature of 45° C., the urea solution 75° C. and the methylene chloride 41° C. The urea solution was cooled by the oil and the liquid and evaporating methylene chloride, so that finely divided urea separated out immediately.

By evaporating a part of the methylene chloride the temperature of the mixture was at the same time brought to about 41° C. Heating above the boiling range of the methylene chloride due to the heat generated by the formation of adduct was avoided by the evaporation of methylene chloride.

The evaporated methylene chloride was condensed in a condenser and returned to the mixer. Adduct formation was assisted and accelerated by intense stirring. When the formation of adduct terminated, the mixture was split up in a filter, and the adduct was washed with 100 parts by volume of methylene chloride. The whole of the filtrate was freed from methylene chloride, and there was obtained a de-waxed oil having the following characteristics:

| | |
|---|---|
| Density at 15° C | 0.885 |
| Pour point °C | −24 |
| Cloud point °C | −21 |
| Viscosity (° Engler at 40° C.) | 1.75 |

The adduct separated in the filter was heated directly with hot aqueous condensate containing methylene chloride and also heated directly and indirectly by steam, and passed to a decomposer at about 75° C. The heating operation decomposed the adduct into a paraffin layer and urea solution. After removing the methylene chloride still present in the paraffin layer, the paraffin wax was obtained in a yield of 17 percent by weight of the spindle oil, and had a melting point of 32° C. The urea solution, obtained by decomposing the adduct, was thickened, i.e. freed from a part of its water content, and then re-used at a temperature of 75° C.

We claim:

1. In a process for separating normal paraffinic hydrocarbons capable of forming adducts with urea from hydrocarbon oils by treating the latter with a concentrated aqueous solution of the urea in the presence of a solvent for the hydrocarbon oil, the steps comprising mixing a hot aqueous solution of urea, which has a water content within the range of 10 to 40 percent by weight, with the hydrocarbon oil to be treated and with methylene chloride, the proportion of the methylene chloride amounting to 50–200 parts by volume per 100 parts by volume of oil, and the oil and the methylene chloride being at a temperature below that of the hot aqueous solution of urea, vigorously agitating the mixture to bring it to and maintain it at the temperature desired for adduct formation by evaporation of a part of the methylene chloride until a two-phase mixture is formed which is composed of the water-containing granular adduct as solid phase and a solution of the unreacted oil in methylene chloride, separating the granular adduct so formed from the solution of unreacted oil, and decomposing the adduct into normal paraffinic hydrocarbons and urea solution.

2. In a process for separating normal paraffinic hydrocarbons capable of forming adducts with urea from hydrocarbon oils by treating the latter with a concentrated aqueous solution of the urea in the presence of a solvent for the hydrocarbon oil, the steps comprising mixing a hot aqueous solution of urea, which has a water content within the range of 10 to 40 percent by weight and below that required for saturation at the temperature of adduct formation, with the hydrocarbon oil to be treated and with methylene chloride, the proportion of the methylene chloride amounting to 50–200 parts by volume per 100 parts by volume of oil, and the oil and the methylene chloride being at a temperature below that of the hot aqueous solution of urea, vigorously agitating the mixture to bring it to and maintain it at the temperature desired for adduct formation by evaporation of a part of the methylene chloride until a two-phase mixture is formed which is composed of the water-containing granular adduct as solid phase and a solution of the unreacted oil in methylene chloride, separating the granular adduct so formed from the oil solution, and decomposing the adduct into normal paraffinic hydrocarbons and urea solution.

3. In a process for separating normal paraffinic hydrocarbons capable of forming adducts with urea from hydrocarbon oils by treating the latter with a concentrated aqueous solution of the urea in the presence of a solvent for the hydrocarbon oil, the steps comprising mixing a hot aqueous solution of urea, which has a water content withing the range of 10 to 40 percent by weight with the hydrocarbon oil having a temperature slightly above its melting point and such as to cause a part of the urea to separate out by cooling, thereafter mixing the mixture of hot aqueous solution of urea and hydrocarbon oil with methylene chloride, the proportion of the methylene chloride amounting to 50–200 parts by volume per 100 parts by volume of oil, and the oil and the methylene chloride being at a temperature below that of the hot aqueous solution of urea, vigorously agitating the resulting mixture of hydrocarbon oil together with the hot aqueous solution of urea and methylene chloride to bring it to and maintain it at the temperature desired for adduct formation by evaporation of a part of the methylene chloride until a two-phase mixture is formed which is composed of the water-containing granular adduct as solid oil in methylene chloride, separating the granular adduct so formed from the oil solution, and decomposing the adduct into normal paraffinic hydrocarbons and urea solution.

4. A process as claimed in claim 1, wherein the solvent evaporated from the mixture is condensed and returned to the mixture.

5. A process as claimed in claim 1, wherein the hot urea solution is first mixed with the oil to be treated and the oil solvent is subsequently added to the mixture.

6. A process as claimed in claim 1, wherein the hot urea solution is a clear solution, the temperature of which lies above the lower saturation temperature.

7. A process as claimed in claim 1, wherein the adduct is rapidly heated and decomposed by direct contact with a hot medium selected from the group consisting of hot aqueous condensate and steam, the liquid paraffin layer is separated, and the dilute urea solution is concentrated by evaporation to the said water content and then continuously returned to the process.

8. A process as claimed in claim 7, wherein the vapors expelled during the concentration of the dilute urea solution are fractionally condensed, and the hot condensate containing oil solvent is used for decomposing the adduct.

9. A process as claimed in claim 1, wherein the adduct is decomposed with hot water and steam at 70–80° C., and the dilute urea solution so obtained is concentrated by evaporation to a water content of 30 percent and then mixed at 70–80° C. with the oil to be treated.

10. A process as claimed in claim 1, wherein the hot urea solution is a suspension of urea in urea solution the temperature of which lies between 60° C. and the adduct forming temperature.

References Cited in the file of this patent

UNITED STATES PATENTS

| | | |
|---|---|---|
| 2,499,820 | Fetterly | Mar. 7, 1950 |
| 2,578,054 | Fetterly | Dec. 11, 1951 |
| 2,588,602 | Adams et al. | Mar. 11, 1952 |
| 2,723,220 | Axe | Nov. 8, 1955 |
| 2,816,821 | Weedman et al. | Dec. 17, 1957 |
| 2,872,409 | Franz et al. | Feb. 3, 1959 |